United States Patent
Dias et al.

(10) Patent No.: US 12,392,433 B2
(45) Date of Patent: *Aug. 19, 2025

(54) PRESS FITTING DEVICE, COMPONENTS AND METHOD

(71) Applicant: Quick Fitting Holding Company, LLC, East Providence, RI (US)

(72) Inventors: Libardo Ochoa Dias, West Warwick, RI (US); Herbert J. Bouchard, West Greenwich, RI (US)

(73) Assignee: Quick Fitting Holding Company, LLC, East Providence, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/536,532

(22) Filed: Dec. 12, 2023

(65) Prior Publication Data

US 2024/0102592 A1 Mar. 28, 2024

Related U.S. Application Data

(63) Continuation of application No. 17/481,804, filed on Sep. 22, 2021, now Pat. No. 11,885,448.

(51) Int. Cl.
*F16L 37/086* (2006.01)
*F16L 13/14* (2006.01)
*F16L 37/091* (2006.01)

(52) U.S. Cl.
CPC .......... *F16L 37/086* (2013.01); *F16L 13/142* (2013.01); *F16L 37/091* (2013.01); *F16L 2201/10* (2013.01)

(58) Field of Classification Search
CPC ..... F16L 13/141; F16L 13/142; F16L 37/091; F16L 37/0925; F16L 21/03
USPC .......................................................... 285/379
See application file for complete search history.

(56) References Cited

U.S. PATENT DOCUMENTS

| | | | |
|---|---|---|---|
| 2010/0102038 A1* | 4/2010 | Baum | F16L 21/03 |
| 2015/0102595 A1 | 4/2015 | Crompton | |
| 2019/0093807 A1 | 3/2019 | Crompton | |

FOREIGN PATENT DOCUMENTS

| | | |
|---|---|---|
| DE | 102013015895 A1 | 3/2015 |
| EP | 2677225 A2 | 12/2013 |

OTHER PUBLICATIONS

European Patent Office, Extended European Search Report in EP Application No. 22873457.0, Nov. 29, 2024.

* cited by examiner

*Primary Examiner* — Zachary T Dragicevich
(74) *Attorney, Agent, or Firm* — Williams Mullen; Thomas F. Bergert

(57) ABSTRACT

A press fitting device, components and method provide one or more indicators to provide a visual indication that the fitting has been properly pressed around a tube and that the correct amount of pressure has been provided to create a permanent seal. In embodiments, a sealing ring and a latching band are retained within a main body component of the fitting and the latching band can be formed with a radially inwardly extending latch that extends through an opening in the sealing ring.

21 Claims, 14 Drawing Sheets

Fig. 17
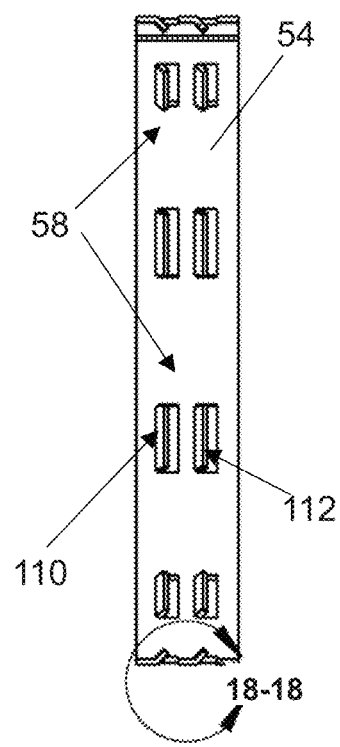
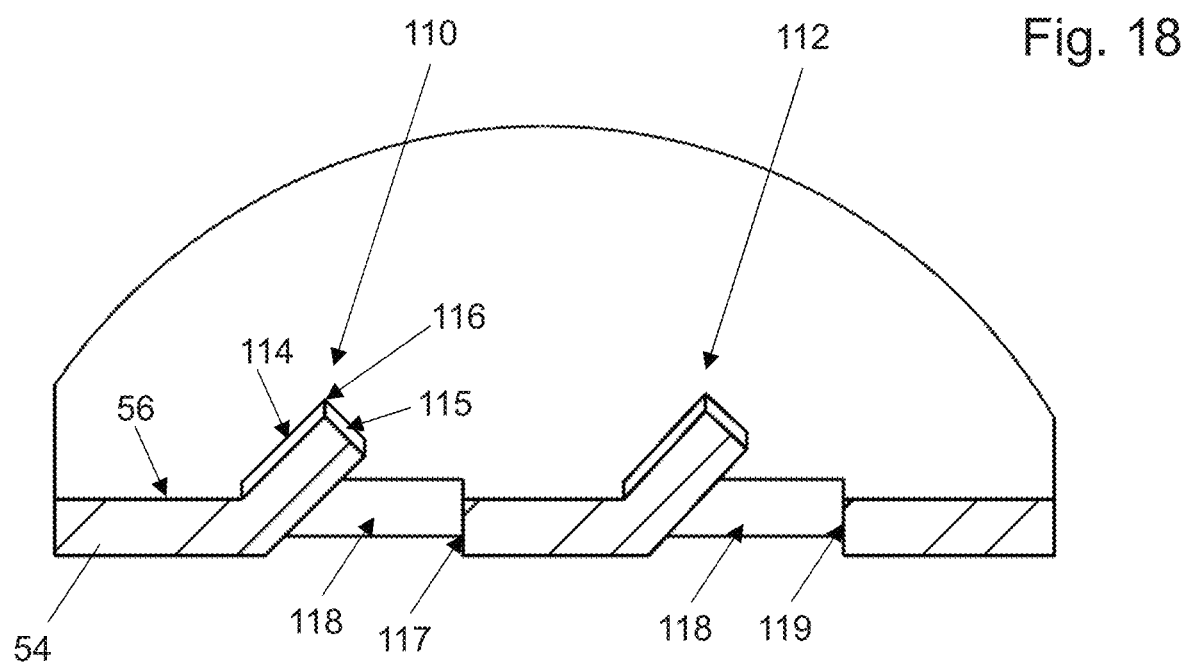
Fig. 18

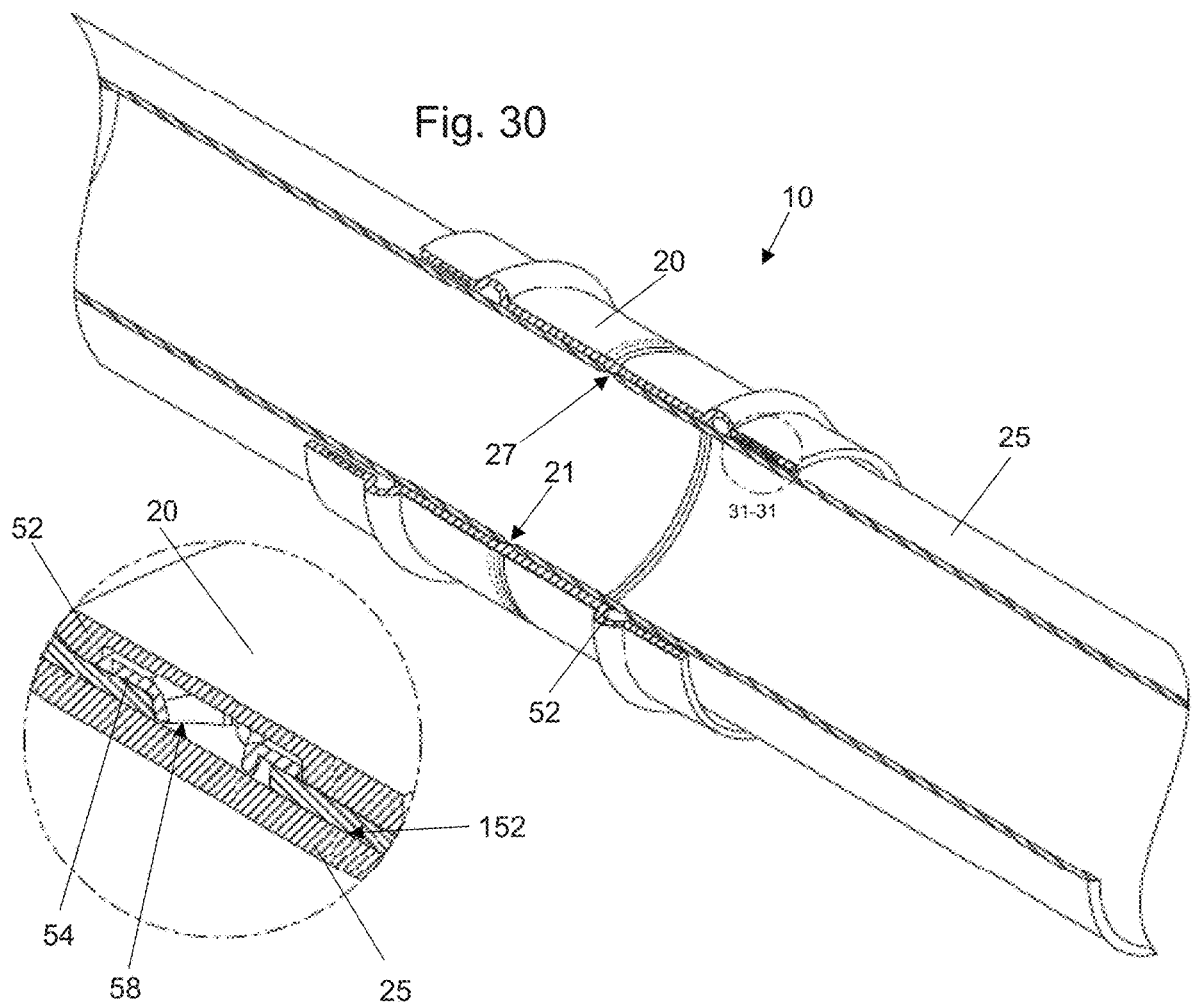

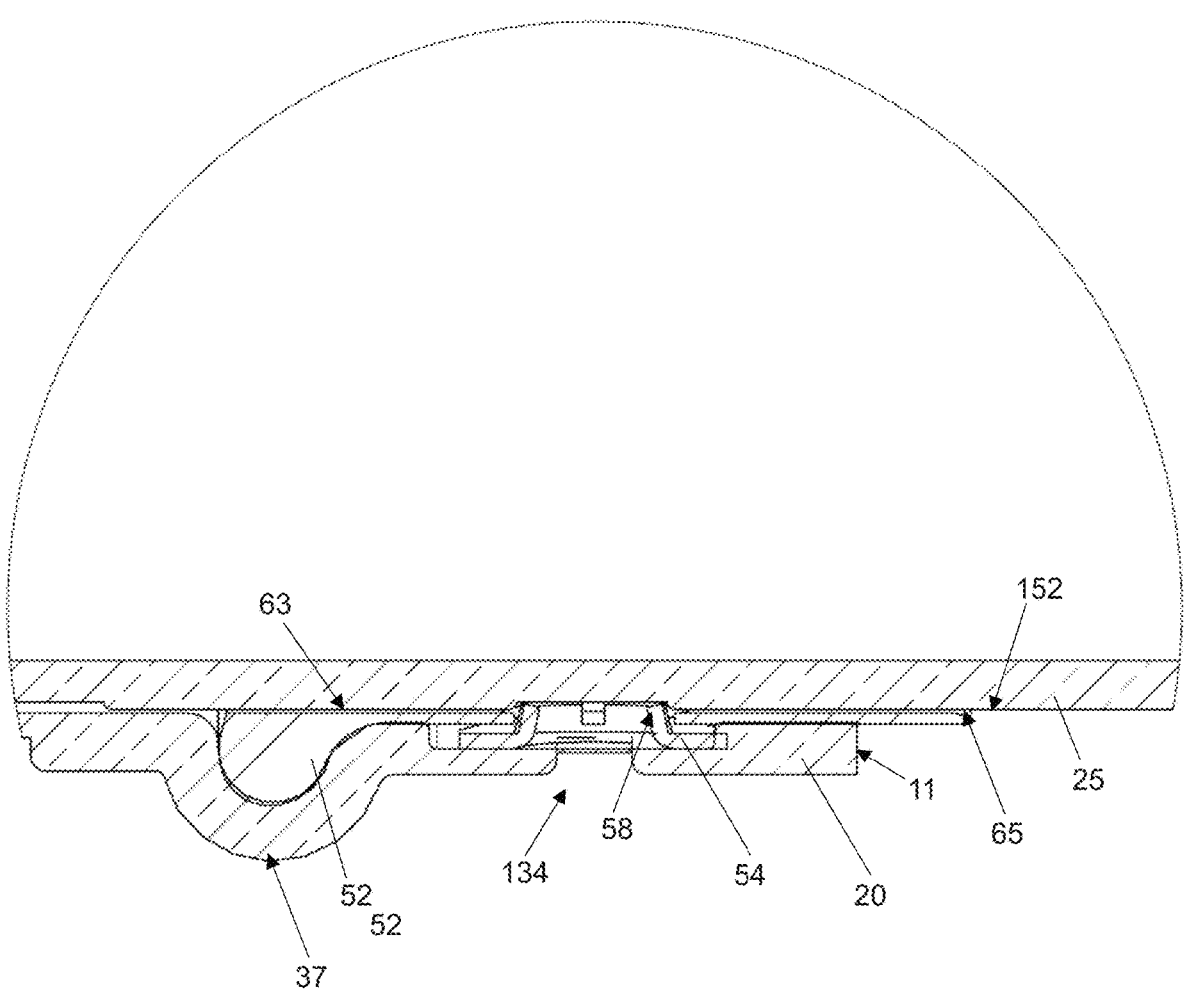

PRESS FITTING DEVICE, COMPONENTS AND METHOD

CROSS REFERENCE TO RELATED APPLICATIONS

The present application is a continuation of U.S. patent application Ser. No. 17/481,804, filed on Sep. 22, 2021, now U.S. Pat. No. 11,885,448, the disclosure of which is hereby incorporated herein in its entirety by reference.

TECHNICAL FIELD

The present invention relates to fluid flow systems, and more particularly to press fittings with visual indicators for use in fluid flow systems.

BACKGROUND

Piping systems exist to facilitate the flow of fluids (e.g., liquid, steam, gas (such as air) or plasma). For example, homes, schools, medical facilities, commercial buildings and other occupied structures generally require integrated piping systems so that water and/or other fluids can be circulated for a variety of uses. Liquids and/or gases such as cold and hot water, breathable air, glycol, compressed air, inert gases, cleaning chemicals, waste water, plant cooling water and paint and coatings are just some examples of the types of fluids and gases that can be deployed through piping systems. Tubing and piping types can include, for example, copper, stainless steel, CPVC (chlorinated polyvinyl chloride), iron, black iron, ductile iron, gray iron, HDPE (high density polyethylene) and PEX (cross-linked polyethylene). For purposes of the present disclosure, the term "pipe" or "piping" will be understood to encompass one or more pipes, tubes, piping elements and/or tubing elements.

Piping connections are necessary to join various pieces of pipe and must be versatile in order to adapt to changes of pipe direction required in particular piping system implementations. For example, fittings and valves may be employed at the ends of open pieces of pipe that enable two pieces of pipe to fit together in a particular configuration. Among fitting types there are elbows, "tees", couplings adapted for various purposes such as pipe size changes, ends, ball valves, stop valves, and partial angle connectors, for example.

In the past, pipe elements have been traditionally connected by welding and/or soldering them together using a torch. Soldering pipe fittings can be time-consuming, unsafe, and labor intensive. Soldering also requires employing numerous materials, such as copper pipes and fittings, emery cloths or pipe-cleaning brushes, flux, silver solder, a soldering torch and striker, a tubing cutter and safety glasses, for example. The process for soldering pipes can proceed by first preparing the pipe to be soldered, as the copper surface must be clean in order to form a good joint. The end of the pipe can be cleaned on the outside with emery cloth or a specially made wire brush. The inside of the fitting must be cleaned as well. Next, flux (a type of paste) can be applied to remove oxides and draw molten solder into the joint where the surfaces will be joined. The brush can be used to coat the inside of the fitting and the outside of the pipe with the flux. Next, the two pipes are pushed together firmly into place so that they "bottom out"—i.e., meet flush inside the fitting. The tip of the solder can be bent to the size of the pipe in order to avoid over-soldering. With the pipes and fitting in place, the torch is then ignited with the striker or by an auto-strike mechanism to initiate soldering. After heating for a few moments, if the copper surface is hot enough such that it melts when touched by the end of the solder, the solder can then be applied to the joint seam so that it runs around the joint and bonds the pipe and fitting together.

In addition to welding methods, pipe elements have been secured together through pressure. A press fitting, which is also known as a friction fit or an interference fit, is a fastening of parts that takes place through friction after the parts are pushed or compressed together, as opposed to being connected by threads, glue, solder or other methods. Press fittings of fluid flow parts such as plumbing parts can be created by force, through the use of a hand tool, for example. Hand tools, often called press tools, can take the form of a pair of movably engaged jaws similar to a pair of pliers, for example, where the jaws have a head portion of a certain size designed to fit around parts that are to be connected. For instance, a pipe can be inserted into a fitting made of a somewhat compressible material, whereupon pressure can be applied through the press tool to the outside of the fitting in order to compress the fitting around the pipe. It is critical that the press tool be appropriately applied around the entire circumference of the fitting in order to ensure a tight connection. Once connected, the parts can be used for various purposes. In the field of fluid flow, the connected parts can be used to direct the flow of fluids, such as gases, water and other liquids as described above.

Traditional press fittings are frequently improperly sealed or only partially sealed. If an installer has not properly pressed the fitting to provide a permanent seal, fluid can leak, causing great damage and cost. Imperfections or scarring in the tubing being inserted also presents an opportunity for the connection to leak following compression. In many installation environments, installers take work breaks or otherwise become distracted as to which of a number of press fittings have been properly compressed and which have been either improperly compressed or not at all. When this happens, there has been no simple and fast way (other than catastrophic failure or leakage) to determine which fittings have been properly pressed, which can result in lost time spent determining which fittings need to be pressed or have been damaged in the application environment.

Press-fit technology for piping systems with visual indicators can be obtained, for example, through Quick Fitting Holding Company, LLC of Providence, Rhode Island, USA, suppliers of the CoPro®, ProBite®, LocJaw™, Blue-Hawk™, CopperHead® and Push Connect® lines of push fittings and related products. Also, such technology is described, for example, in U.S. Pat. Nos. 8,888,145 and 9,416,897, the disclosures of which are incorporated herein by reference in their entireties.

SUMMARY

Embodiments of the device of the present disclosure, in part, assist in providing one or more visual indicators to assist an individual in determining whether a piping element such as a fitting has been pressed, and whether the correct amount of force has been applied to create a positive and/or permanent seal. In embodiments of the present disclosure, a fitting is provided having a main body component, with a sealing ring and a latching band securely maintained, at least in part, against a portion of the interior wall of the main body component. The sealing ring is malleable and expandable when properly compressed so as to extend outside of the fitting around an inserted pipe. In this way, an installer, inspector or other individual can visually determine very quickly whether a press fitting has been compressed, and whether there is a proper and complete seal. In various embodiments, the latching band is formed with a radially inwardly extending latch that extends through an opening in the sealing ring within a cavity of the fitting, such that an inserted pipe will be snugly retained within the main body component when the fitting has been compressed.

BRIEF DESCRIPTION OF THE DRAWINGS

FIG. 17 is a cross-sectional view of an alternative latching band according to embodiments of the present disclosure.

FIG. 18 is a detailed view of encircled portion 18-18 of FIG. 17.

FIG. 30 is a perspective view in cross section showing inserted pipes in a fitting according to embodiments of the present disclosure prior to compression.

FIG. 31 is a detailed view of encircled portion 31-31 of FIG. 30.

FIG. 34 is a detailed view of encircled portion 34-34 of FIG. 33.

DETAILED DESCRIPTION OF EMBODIMENTS

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

It will be appreciated that reference to "a", "an" or other indefinite article in the present disclosure encompasses one or a plurality of the described element. Thus, for example, reference to a processor may encompass one or more processors, a message may encompass one or more messages, a topic may encompass one or more topics and so forth. For purposes of the present disclosure, it will be appreciated that a fitting can encompass a valve member and other piping elements including, but not limited to: a coupling joint, an elbow joint, a tee joint, a stop end, a ball valve member, tubing and other objects having cylindrical openings.

Figure 1:
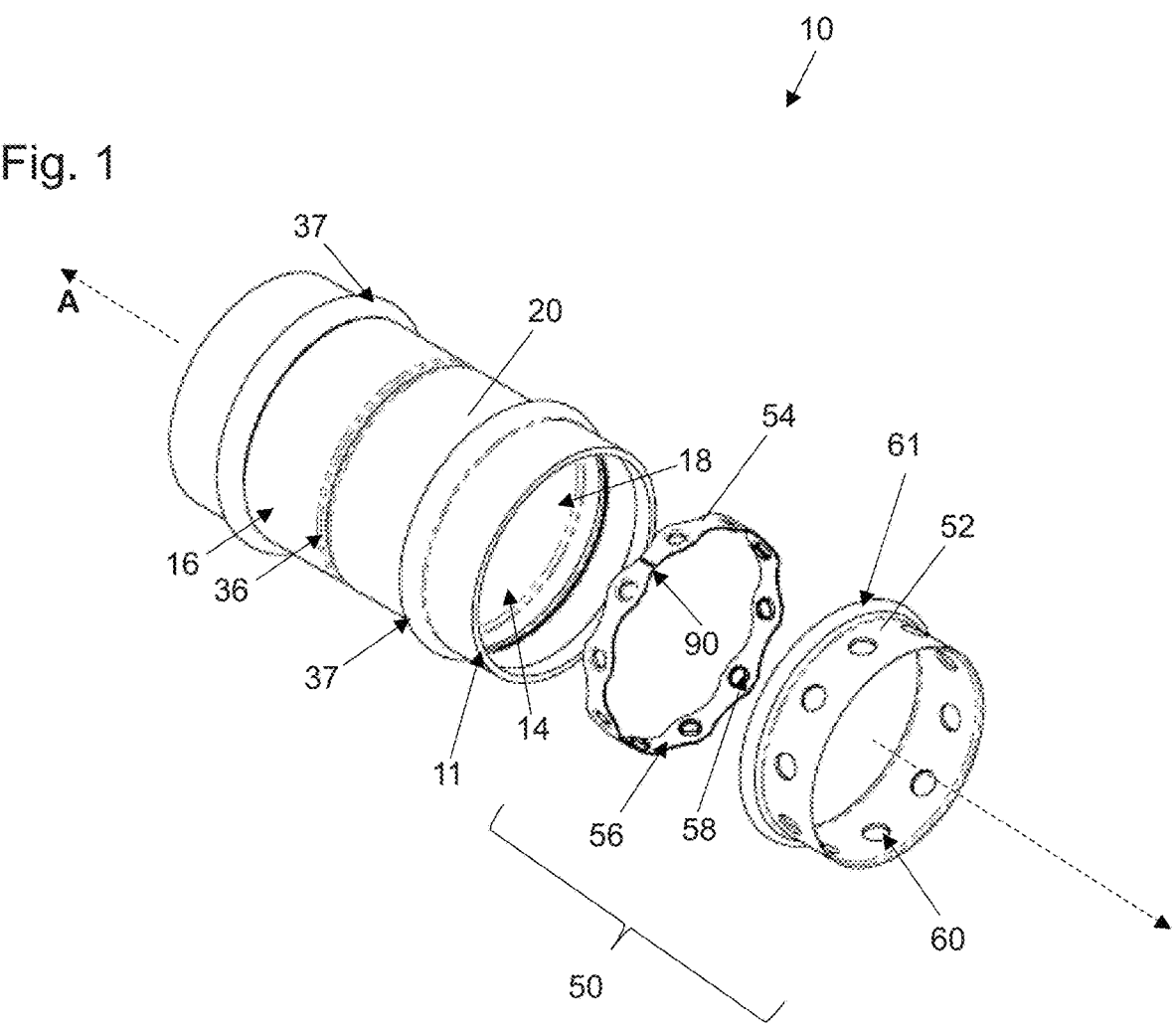
FIG. 1 is an exploded perspective view of a fitting and components in accordance with embodiments of the present disclosure.
Figure 2:
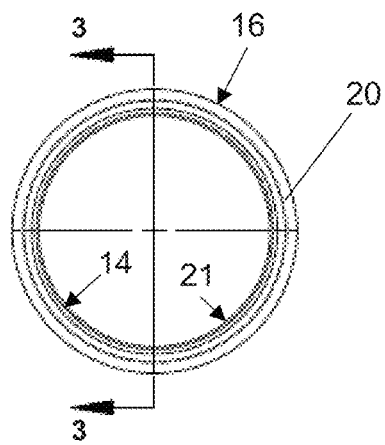
FIG. 2 is a right side view of the main body component of FIG. 1.
Figure 32:
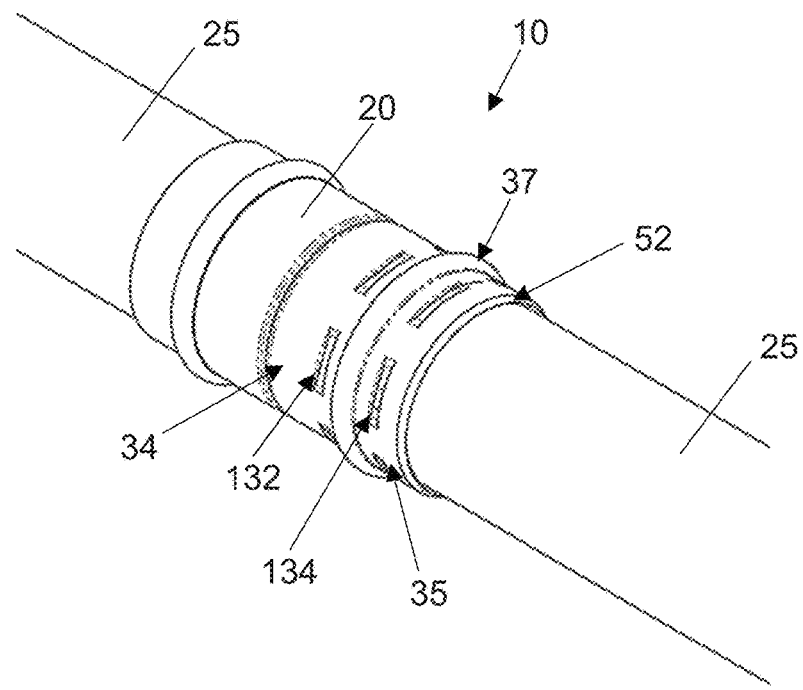
FIG. 32 is a perspective view of a fitting according to embodiments of the present disclosure with pipe installed at two ends.
Figure 33:
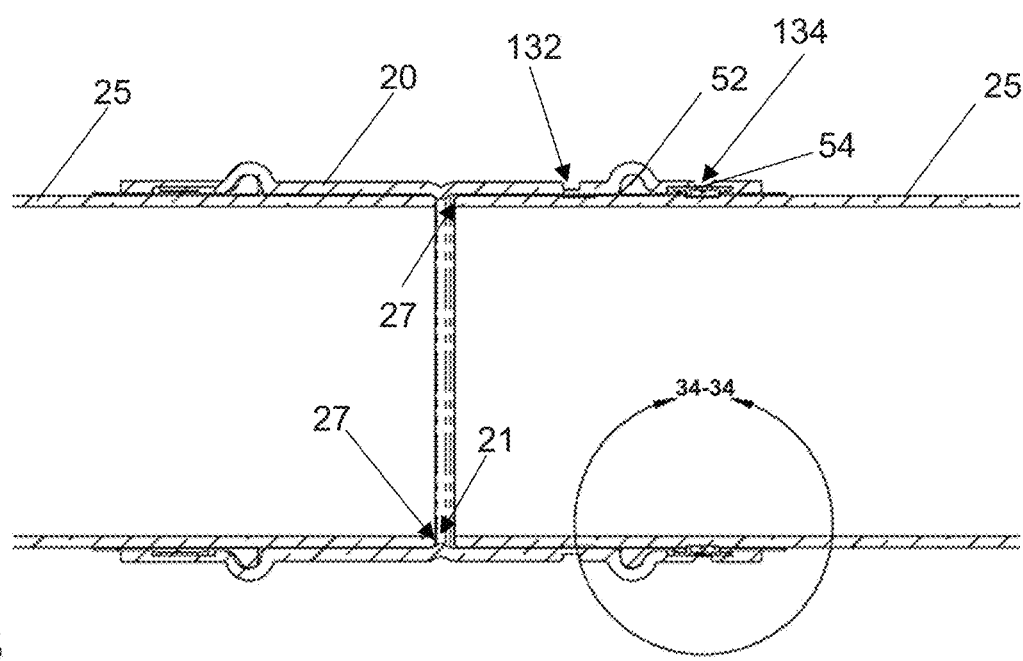
FIG. 33 is a cross-sectional view of the fitting of FIG. 32.

As shown in FIGS. 1 through 34, embodiments of the present disclosure provide a fitting 10 having a somewhat cylindrically shaped main body component 20 with an interior surface 14 and an exterior surface 16. The main body component 20 is formed with an axially outer edge 11. In various embodiments, the main body component 20 can be formed (e.g., forged, cast, extruded and/or pressed) in brass, aluminum, steel, malleable iron or copper, with full porting and full flow fitting, for example. FIGS. 1, 6 and 30 illustrate embodiments of the main body component 20 with a solid exterior surface 16, whereas FIGS. 32 through 34 illustrate embodiments of the main body component 20 with openings 132, 134 formed through and around the periphery of the main body component 20. Such openings 132, 134 can be employed to view internal components of a packing arrangement 50 as described elsewhere herein.

As further shown in the drawings, the interior surface 14 defines a cavity 18 extending through the main body component 20 along a central axis A, and includes a tube stop element 21 extending radially inwardly at the general axial midpoint of the main body component 20. The tube stop 21 separates the interior 14 into first 31 and second 33 interior compartments, and when a pipe 25 of appropriate diameter is inserted into either compartment 31, 33, the pipe's axial end wall 27 abuts the tube stop 21 as shown in FIGS. 30 and 33 so that the pipe cannot be inserted axially further into main body component 20. It will be appreciated that embodiments of the present disclosure may provide a fitting having only a first interior compartment 31.

As shown in FIGS. 1 through 5, the interior surface 14 includes an axially inner segment 30 and axially outer segment 40. The axially inner segment 30 extends a radial distance B from the axis A and the axially outer segment 40 extends different radial distances at different axial locations. For example, the axially outer segment 40 of the main body component 20 can be formed with first 41 and second 42 indentations and a floor 43, where the radial distance C from the axis A to the second indentation 42 is greater than the radial distance D from the axis A to the first indentation 41 as well as the radial distance E from the axis A to the floor 43. Further, the radial distance D to the first indentation 41 is greater than the radial distance E to the floor 43. In various embodiments, the various radial distances C, D and E of the axially outer segment 40 are each greater than the radial distance B from the axis A to the axially inner segment 30. In various embodiments, the first indentation 41 extends parallel to the axis A and the second indentation 42 is rounded. The first indentation 41 facilitates mating reception of a latching band 54 and the second indentation facilitates mating reception of a sealing ring 52 as described elsewhere herein.

Figure 4:
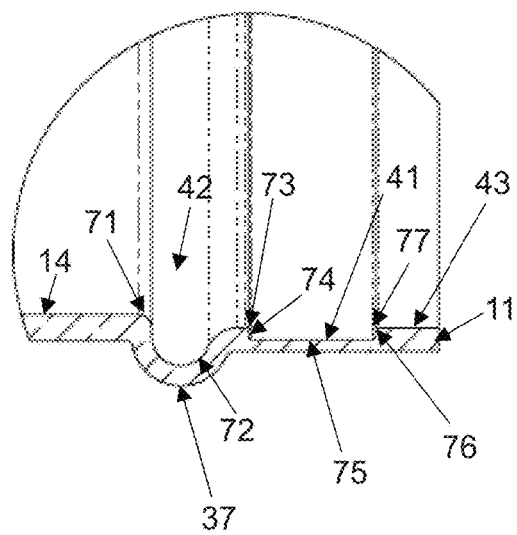
FIG. 4 is a detailed view of encircled portion 4-4 of FIG. 3.

As shown in the embodiment of FIG. 4, the first indentation 41 lies axially outwardly of the second indentation 42 and includes an axially outer wall 76 extending radially outwardly from an outer ledge 77 and an axially inner wall 74 extending radially outwardly from an inner ridge 73. The first indentation 41 further includes an indentation floor 75 extending axially outwardly from the axially inner wall 74 to the axially outer wall 76. In the embodiment shown in FIG. 4, the second indentation 42 includes a rounded supporting floor 72 extending from an axially inner segment edge 71 to inner ridge 73. The floor 43 which can include inner ridge 73 has a greater radial distance E from axis A than the radial distance B from the axis A to the axially inner segment 30 in order to accommodate a sealing ring 52 of the packing arrangement 50, as described elsewhere herein.

Figure 3:
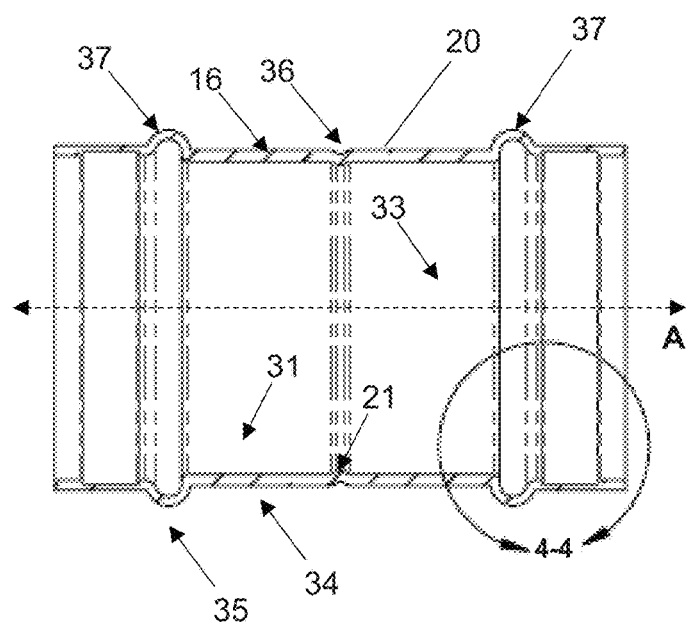
FIG. 3 is a cross-sectional view of the main body component of FIG. 1.
Figure 5:
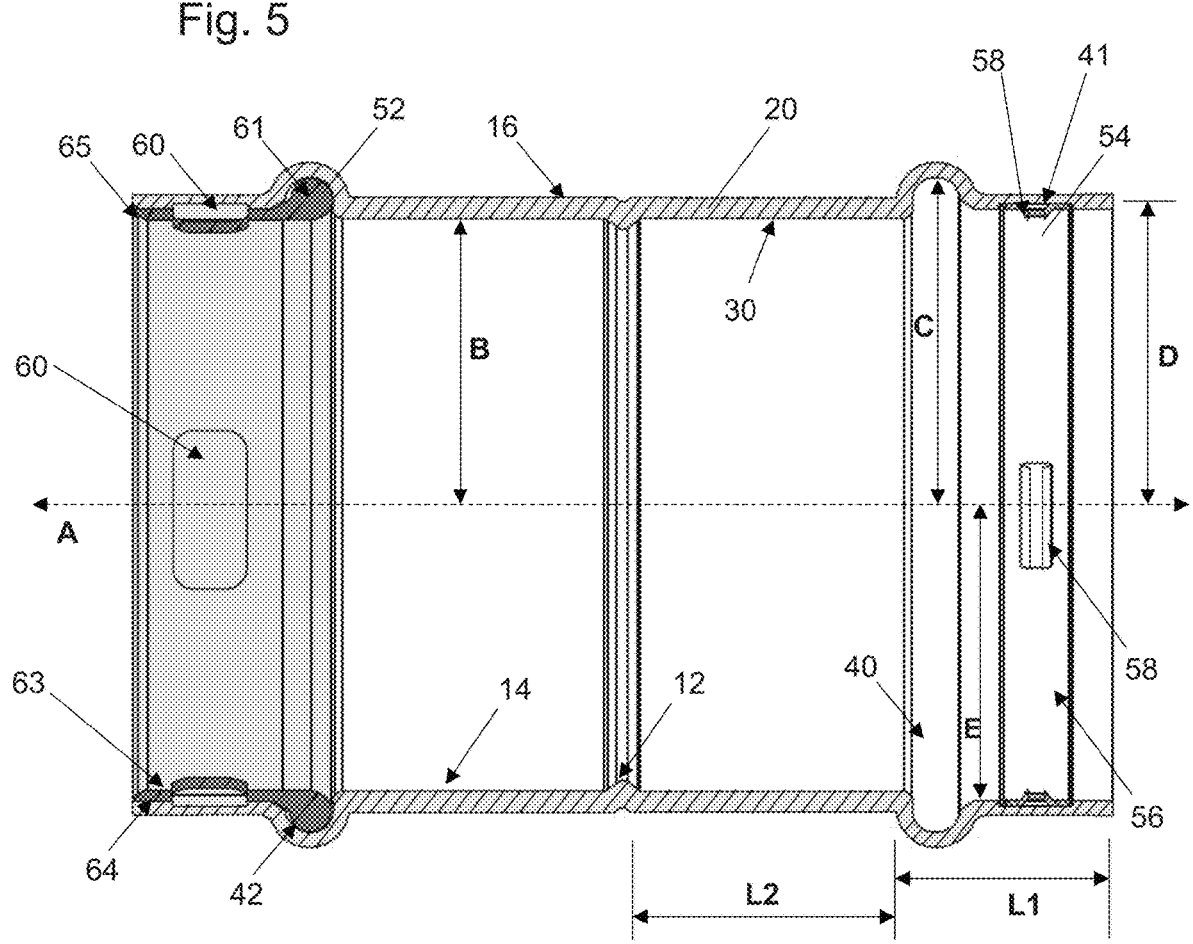
FIG. 5 is a cross-sectional view of a fitting with installed components according to embodiments of the present disclosure.
Figure 6:
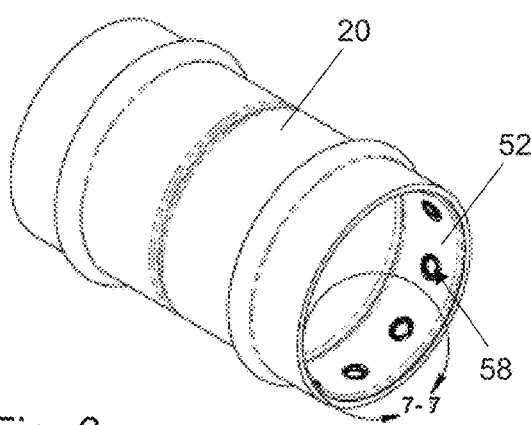
FIG. 6 is a perspective view of a fitting with installed components according to embodiments of the present disclosure.
Figure 7:
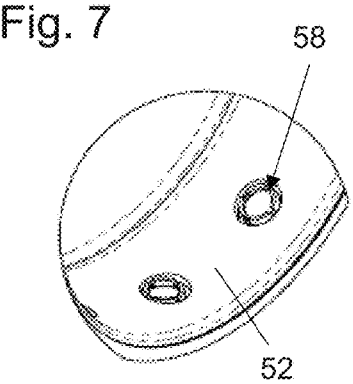
FIG. 7 is a detailed view of encircled portion 7-7 of FIG. 6.

As shown in FIGS. 3 and 5, the exterior surface 16 includes an axially inner segment 34 and an axially outer segment 35 that generally correspond on an axial basis with respective axially inner 30 and outer 40 segments of the interior surface 14. An exterior ridge 37 on the exterior surface 16 corresponds to the second indentation 42. A radially indented groove 36 can also be formed on the exterior surface 16 corresponding to the axial position of the tube stop 21, as shown in FIG. 3. The main body component 20 can be formed so as to have a first radial thickness corresponding to the axially inner segment 30 and a second radial thickness corresponding to the axially outer segment 40, wherein the first radial thickness is greater than the second radial thickness. Further, the main body component 20 can be formed so as to have a variable radial thickness corresponding to the axially outer segment 40, wherein the radial thickness corresponding to the first indentation 41 is less than the radial thickness corresponding to the second indentation 42. The different radial thicknesses facilitate engagement with the packing arrangement 50 and inserted piping during operation.

In various embodiments, the axially outer segment 40 of the main body component 20 can be provided or compressed into a fluted form, whereby its radial distance from axis A increases as the axially outer segment 40 extends axially outwardly from the axially intermediate segment 40. In this way, the main body component 20 provides an expanding surface area for the sealing ring 52 to expand into as one or more pipes or tubes (illustrated at 25 in FIGS. 28 through 34) are inserted and clamping pressure is applied, as explained in more detail elsewhere herein.

In various embodiments, as shown in FIGS. 1 and 5 through 34, a packing arrangement 50 is provided and can include one or more of the following components: a sealing or indicator ring 52 and a latching band 54. The sealing ring 52 can be a substantially ring-shaped, monolithic body having a substantially circular body cross-section, and can be formed from a rubber, synthetic or similar non-metallic and compressible material. Optionally, ring 52 can be lubricated with a food grade lubricant, for example, when installed and during use. The latching band 54 can be formed of a metallic material, such as brass, aluminum, steel, malleable iron or copper, in various embodiments. Each of the indicator ring 52 and latching band 54 can comprise individual pieces which are not formed together.

Figures 11, 12, 13, 14A:
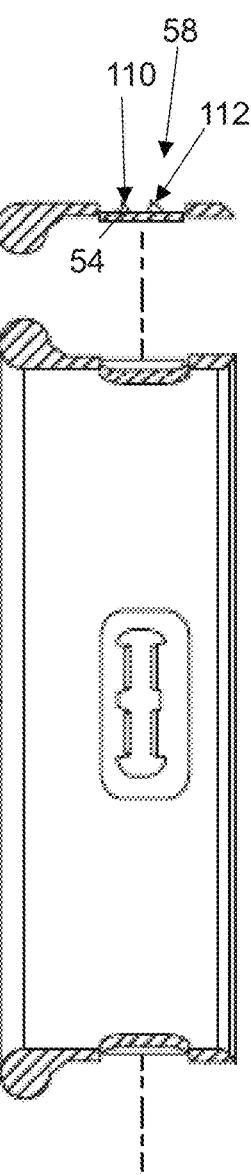
FIGS. 11 through 14C are cross-sectional views of a sealing ring as mated with a latching band according to multiple embodiments of the present disclosure.

As shown in FIG. 5, the latching band 54 can be securely maintained within the first indentation 41 of the interior surface 14 of the main body component 20. As shown in FIGS. 11 through 27, the latching band 54 can be formed with a radially inner surface 56, a radially outer surface 57 and a radially inwardly extending latch 58. The radially inwardly extending latch 58 can be formed as a concave band 82, one or more rings 84, one or more teeth 80 and/or a row of teeth 83 and a concave band 82. In embodiments with a row of teeth 83, the row of teeth 83 can lie axially inwardly of the concave band 82, which can contribute to overall retention of an inserted pipe during operation. In the ring 84 arrangement, the ring 84 can be formed with slots 85 to permit limited flexibility during operation. In still other embodiments as shown in FIGS. 15 through 18, the radially inwardly extending latch 58 can be formed as first 110 and second 112 ridges extending axially and radially outwardly from the radially inner surface 56 of the latching band 54. In such embodiments, the first ridge 110 and/or the second ridge 112 can be split and/or can be formed with a ridge edge surface 116 between a ridge inner surface 114 and a ridge front surface 115. As the radially innermost element, the ridge edge surface 116 engages an inserted pipe during operation. As shown in FIG. 18, an opening 118 can be formed between the first ridge 110 and a ridge interior wall 117, as well as between the second ridge 112 and ridge interior wall 119. Further, in some embodiments such as shown in FIG. 14A, for example, the first ridge 110 extends axially and radially outwardly at a first angle from the latching band 54 (e.g., to the axis A), whereas the second ridge 112 extends axially and radially outwardly at a second angle from the latching band 54 (e.g., to the axis A), wherein the first angle is smaller than the second angle. The first ridge 110 can lie axially inwardly of the second ridge 112.

Figure 14B:
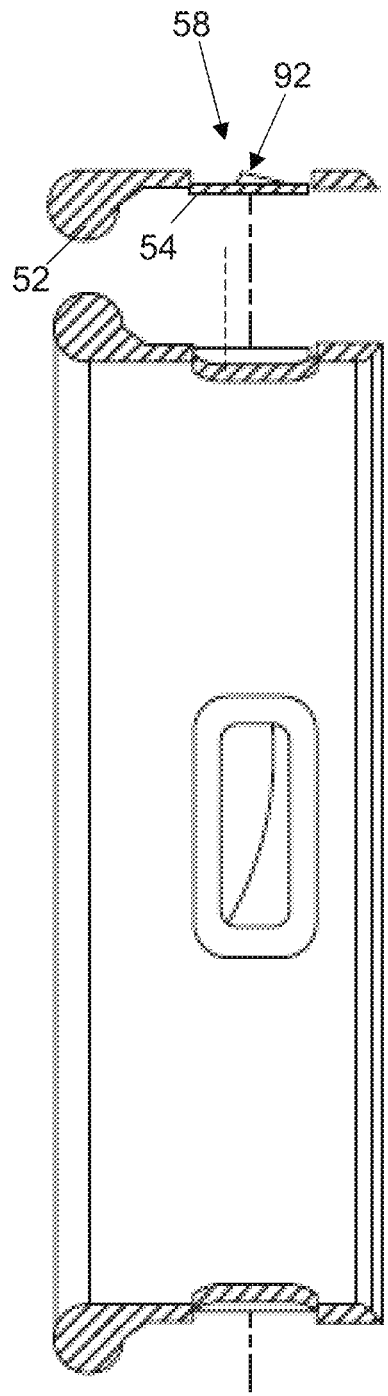
Figure 14C:
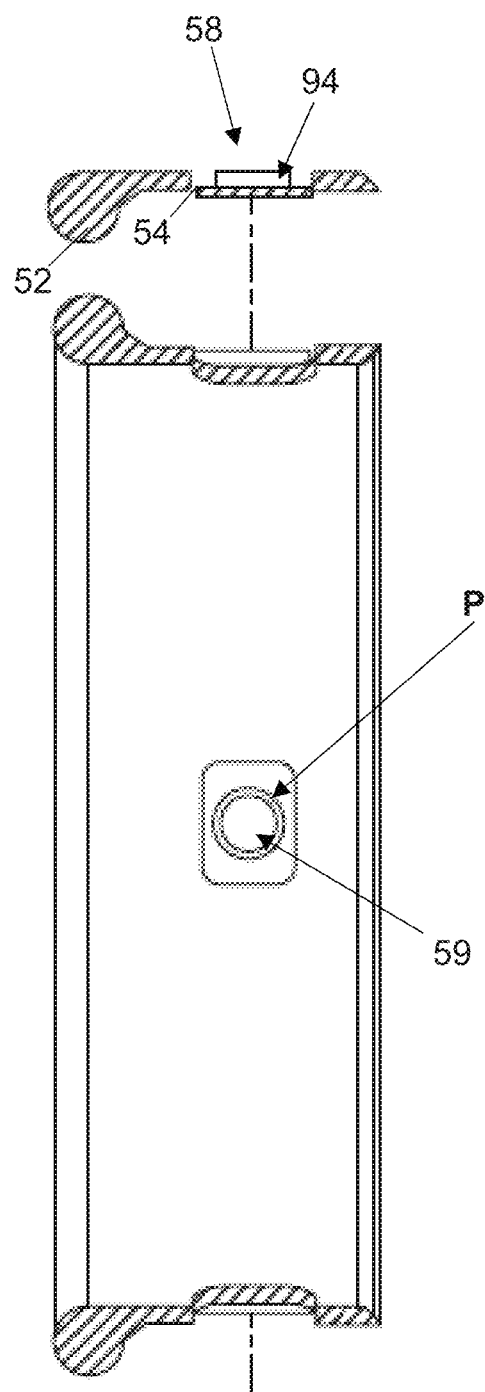
Figure 16:
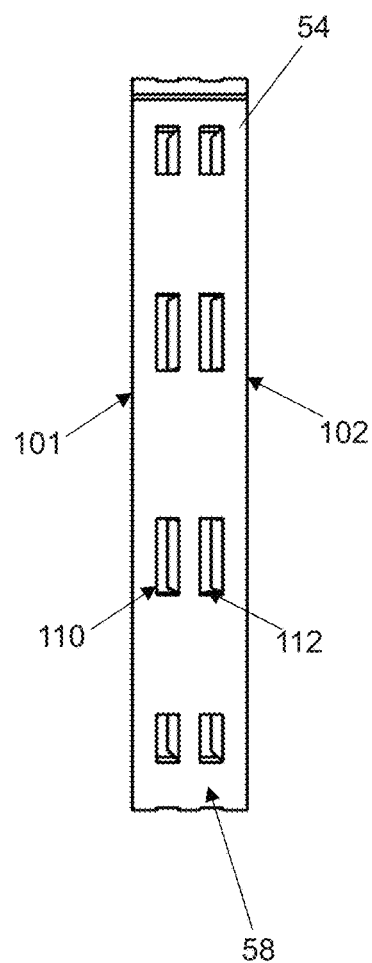
FIG. 16 is a cross-sectional view of the latching band taken along line 16-16 of FIG. 15.
Figure 15:
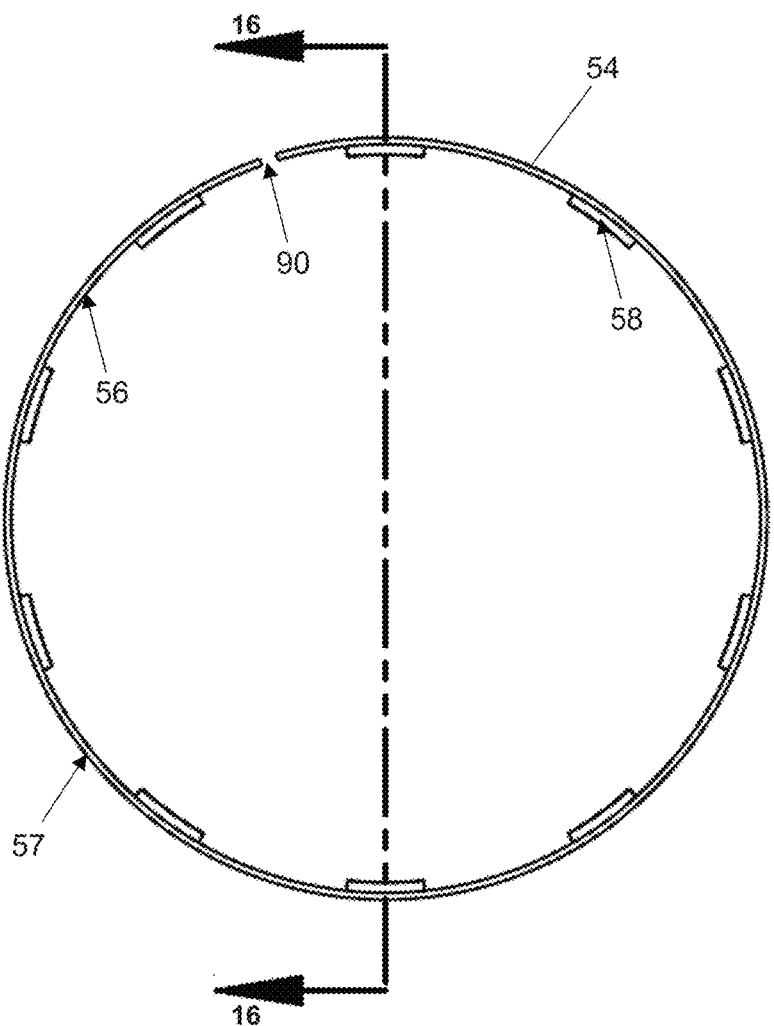
FIG. 15 is a side view of a latching band according to embodiments of the present disclosure.
Figure 19:
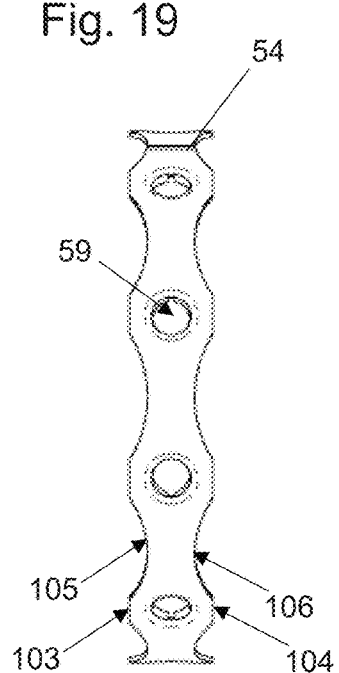
FIG. 19 is a front view of a latching band according to embodiments of the present disclosure.
Figure 20:
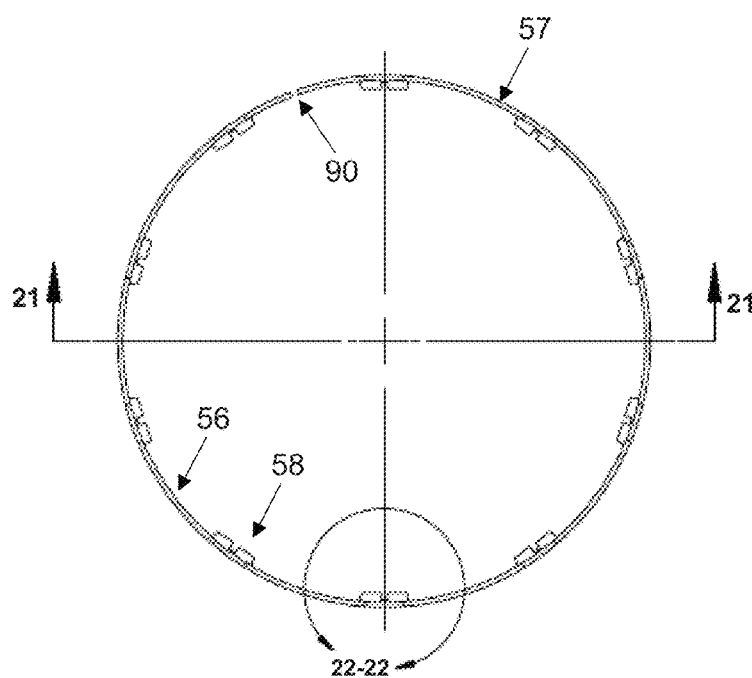
FIG. 20 is a side view of the latching band of FIG. 19.
Figure 22:
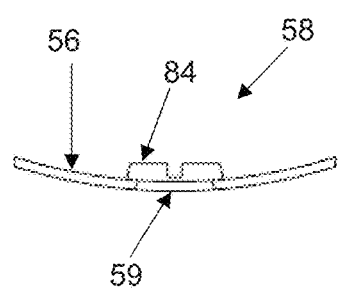
FIG. 22 is a detailed view of encircled portion 22-22 of FIG. 20.
Figure 21:
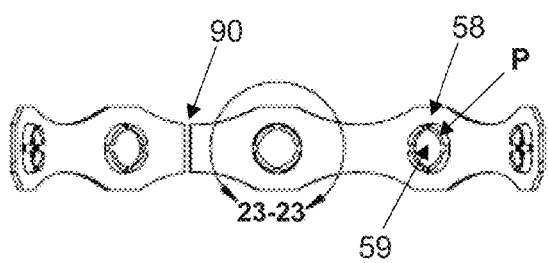
FIG. 21 is a cross-sectional view of the latching band of FIG. 19 taken along line 21-21 of FIG. 20.
Figure 23:
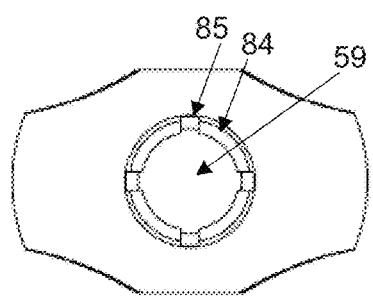
FIG. 23 is a detailed view of encircled portion 23-23 of FIG. 21.
Figure 24:
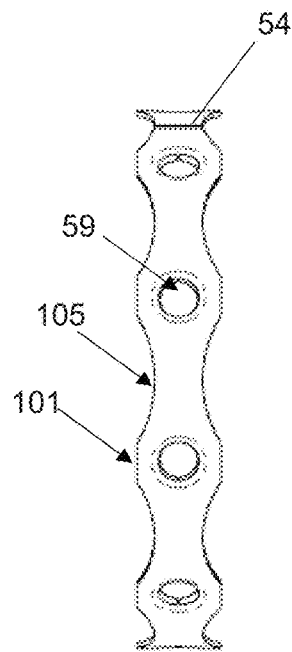
FIG. 24 is a front view of an alternative latching band according to embodiments of the present disclosure.
Figure 25:
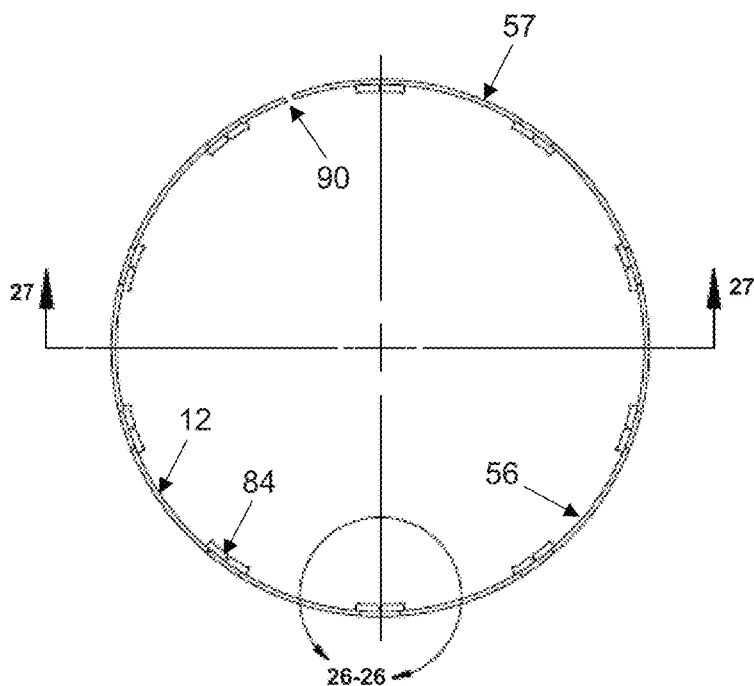
FIG. 25 is a side view of the latching band of FIG. 24.
Figure 26:
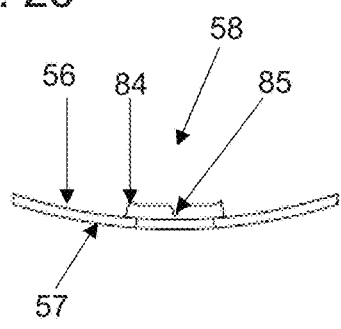
FIG. 26 is a detailed view of encircled portion 26-26 of FIG. 25.
Figure 27:
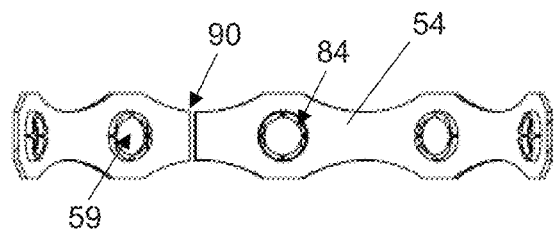
FIG. 27 is a cross-sectional view of the latching band of FIG. 24 taken along line 27-27 of FIG. 25.

In embodiments as shown in FIGS. 14C, 21 and 23, for example, the latching band 54 can be formed with one or more openings 59, wherein a perimeter P extends around the opening 59, and wherein the radially inwardly extending latch 58 is formed at the perimeter P. The latching band may also be split as indicated at 90 in FIGS. 15, 20, 21 and 25. In various embodiments, the split nature of the latching band 54 allows it to compress and/or collapse during insertion into the cavity 18 of main body component 20, as well as during compression when the outer surface 16 of the main body component 20 is compressed, effectively narrowing the split. During such operation, the diameter of the latching band 54 when compressed becomes less than the diameter of the main body component 20 when at rest, and the latching band 54 forms a tighter seal around the inserted pipe 25. As shown in FIGS. 16, 19 and 24, in various embodiments, the latching band 54 can be provided with a substantially constant width between edges 101 and 102 or can be provided with a varying width where wider segments such as formed between edges 103, 104 are adjacent narrower segments such as formed between edges 105, 106. The staggered width arrangement shown by edge pairs 103, 104 and 105, 106 can facilitate easy manipulation of the latching band 54 during installation and removal.

In various embodiments, the radially inwardly extending latch 58 extends into the cavity 18 a radial distance from the axis A that is less than the radial distance B from the axis A to the axially inner segment 30. By extending to a position closer to the axis A than axially inner segment 30, the radially inwardly extending latch 58 can ensure engagement with an inserted pipe in order to provide movement resistance when the pipe is installed. It will be appreciated that the radially inwardly extending latch 58 can extend into the cavity 18 at different lengths so as to be a variable radial distance from the axis A.

Figure 8:
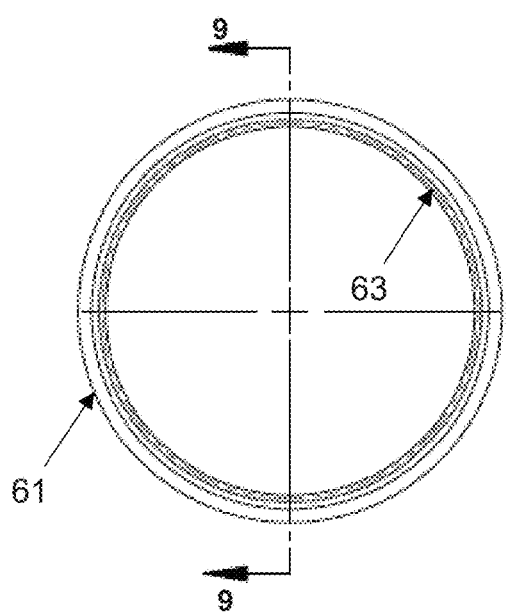
FIG. 8 is a side view of a sealing ring according to embodiments of the present disclosure.
Figure 9:
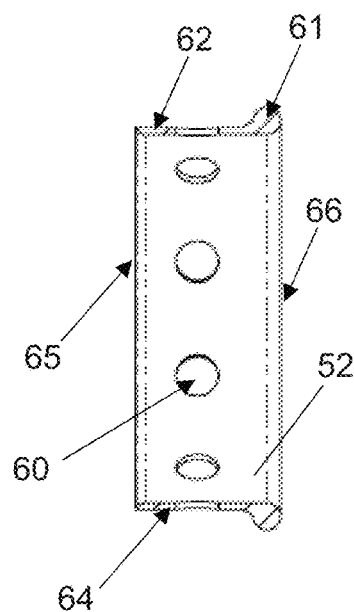
FIG. 9 is a front cross-sectional view of the sealing ring taken along line 9-9 of FIG. 8.
Figure 10:
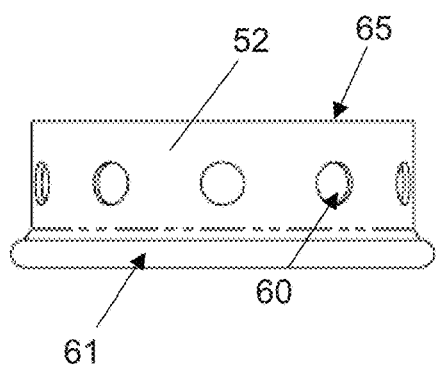
FIG. 10 is a front view of the sealing ring of FIG. 8.

As shown in FIG. 5, the sealing ring 52 is securely maintained within the second indentation 42 and against the radially inner surface 56 of the latching band 54. As shown in FIGS. 8 through 10, the sealing ring 52 can be formed with one or more openings 60 through which the one or more radially inwardly extending latches 58 can extend when the packing arrangement 50 is installed. The sealing ring 52 can be formed as a monolithic component with a retaining bulb 61 and a sealing ring body 62, wherein the retaining bulb 61 and sealing ring body 62 form a sealing ring radially inner surface 63, radially outer surface 64, axially outer edge 65 and axially inner edge 66. The rounded nature of retaining bulb 61 and second indentation 42 can assist in preventing an inserted pipe 25 from extracting the sealing ring 52 from the cavity 18 during operation. The axially outer edge 65 is a portion of the sealing ring 52 that first extends outwardly of the fitting 10 upon proper compression of the fitting 10 with a suitable press tool, as described elsewhere herein.

In various embodiments, when the resilient sealing ring 52 is inserted and retained in the second indentation 42 and against the axially outer segment 40 of the interior 14 of the component 20, the radial distance from axis A to the sealing member's radially inner surface 63 is substantially the same as radial distance B, as can be seen in FIG. 5. In various embodiments, the axially outer segment 40 has a shorter axial length L1 than the axial length L2 of axially inner segment 30. Further, it will be appreciated that the radially inwardly extending latch 58 can extend into the cavity 18 a radial distance from the axis A that is less than a radial distance from the axis to the sealing ring 52, which can ensure engagement with an inserted pipe in order to provide movement resistance when the pipe is installed. In various embodiments, the sealing ring axially outer edge 65 lies axially aligned with or inwardly of the axially outer edge 11 of the main body component 20 when the sealing ring 52 is at rest (as shown in FIG. 5) and lies axially outwardly of the axially outer edge 11 of the main body component 20 when the sealing ring 52 is compressed, such as when a pipe is inserted during operation as shown in FIG. 34, for example.

As shown in FIGS. 5, 8 through 10 and 31, for example, the sealing ring 52 includes surfaces that provide structure to support interoperation, connection and engaged movement with other surfaces of other components of the present disclosure, as shown and described herein. For instance, the radially interior surface 63 of the sealing ring 52 extends exclusively axially and engages the outer surface 152 of an inserted pipe 25 during operation as shown in FIG. 34.

In operation, as shown in FIGS. 1, 5 and 28 through 34, prior to compression of the packing arrangement 50, the packing arrangement 50 is inserted into the main body component 20 so as to reside within the axially outer segment 40 of the inner surface 14 thereof. The latching band 54 is positioned in the first indentation 41, with radially outer surface 57 contacting the indentation floor 75 of the axially outer segment 40 of the interior surface 14. The sealing ring 52 is positioned in second indentation 42 of axially outer segment 40. A pipe 25 is then inserted into the cavity 18 with little or no resistance from the packing arrangement 50 or its elements 52, 54, as the pipe outer surface 152 can be of smaller diameter than the diameters of the uncompressed elements 52, 54. In various embodiments, the pipe outer surface 152 can be of substantially the same diameter of the uncompressed elements 52, 54 other than the diameter of the radially inwardly extending latch 58 of the latching band 54, which is necessarily of smaller diameter in order to function as described herein.

Figure 28:
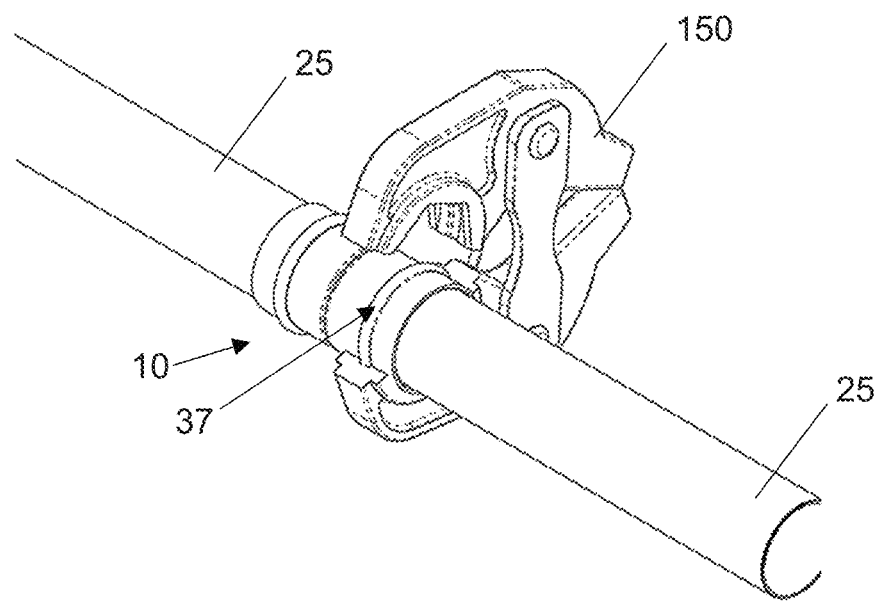
FIG. 28 is a perspective view of a fitting with pipes inserted on either end and prior to compression by a press tool in accordance with embodiments of the present disclosure.
Figure 29:
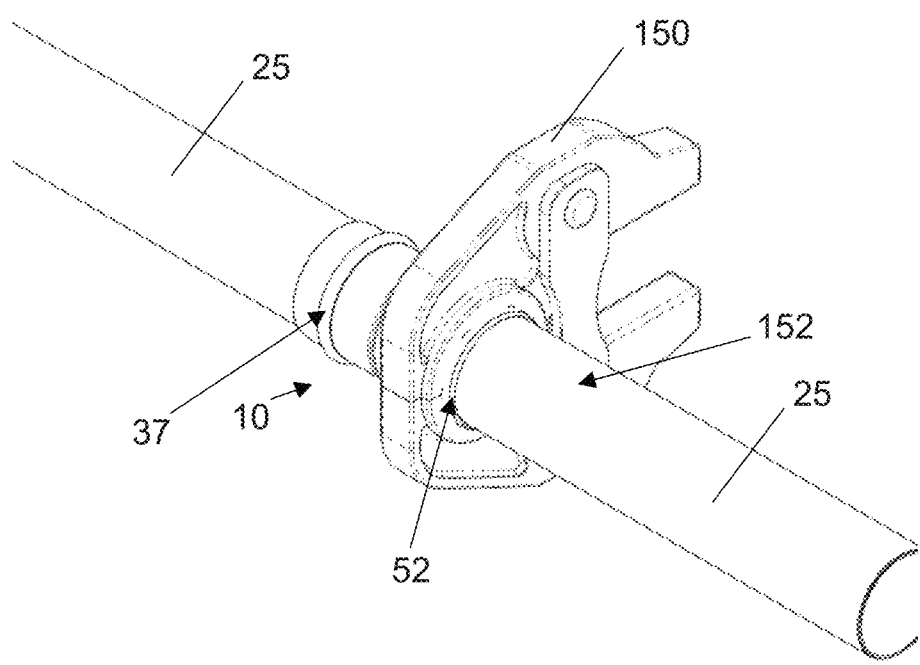
FIG. 29 is a perspective view of the arrangement of FIG. 28 during compression by a press tool in accordance with embodiments of the present disclosure.

As shown in FIGS. 28 and 29, a press tool 150 can be applied around the ridge 37 of the outer surface 16 of the main body component 20 when a pipe or tube 25 has been inserted into the cavity thereof. As the press tool 150 is properly applied, the sealing member 52 and latching band 24 are drawn into contact with the pipe outer surface 152, as shown in FIG. 31, and the sealing ring 52 is extruded outwardly of the axial end wall 11 of the main body component 20, as shown in FIGS. 29, 32 and 34.

The radially inwardly extending latch 58 of the latching band 54 digs into the outer surface 152 of the pipe 25 as the press tool 150 applies pressure. As described elsewhere herein, should the pipe 25 seek to move or escape axially outwardly of the component interior surface 14, the latching band 54 and particularly the radially inwardly extending latch 58 provides additional retaining strength for retaining the pipe 25 within the fitting cavity.

It will thus be appreciated that a single application of the press tool 150 about the circumference of the axially outer segment 40 of the main body component 20 acts to extrude the sealing ring 52 outside of the axially outer end 11 of the main body component 20. If the sealing ring 52 is viewable around the entire circumference of the pipe 25, then an individual will know that the fitting has been appropriately pressed and properly sealed.

It will be appreciated that the sealing ring 52 can be of sufficient durometer and have sufficient expandable material in order to appropriately extrude outside of the fitting 10 when a pipe 25 is inserted, while also filling in any voids, scarring or imperfections in the pipe 25 being inserted as well as in the fitting interior surface 14. The sealing ring 52 can also be of sufficient durometer in order to roll up or pinch when a pipe 25 is improperly inserted, such as when the pipe 25 is inserted at too oblique an angle into the fitting 10.

Embodiments of the present disclosure may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

The invention claimed is:

1. A fitting, comprising:
a main body component comprising interior and exterior surfaces, wherein the interior surface defines a cavity extending through the main body component along an axis, and wherein the interior surface comprises an axially inner segment and an axially outer segment;
a latching band securely maintained within the interior surface, wherein the latching band comprises a radially inner surface and a radially inwardly extending latch, wherein the radially inwardly extending latch comprises a radial distance from the axis that is less than a radial distance from the axis to the axially inner segment;
a sealing ring securely maintained within the interior surface and against the radially inner surface of the latching band, wherein the sealing ring is formed with an opening, and wherein the radially inwardly extending latch extends through the sealing ring opening; and
wherein the main body component comprises an axially outer edge and wherein the sealing ring comprises an expandable material comprising an axially outer edge that lies axially aligned with or inwardly of the axially outer edge of the main body component when the sealing ring is at rest and lies axially outwardly of the axially outer edge of the main body component when the sealing ring is compressed.

2. The fitting of claim 1, wherein the axially outer segment comprises an axially outer segment axial length, and wherein the axially inner segment comprises an axially inner segment axial length that is larger than the axially outer segment axial length.

3. The fitting of claim 1, wherein the latching band and the sealing ring are maintained within the axially outer segment.

4. The fitting of claim 1, wherein the main body component comprises a first radial thickness corresponding to the axially inner segment and a second radial thickness corresponding to the axially outer segment, and wherein the first radial thickness is greater than the second radial thickness.

5. The fitting of claim 1, wherein the latching band is maintained within the interior surface axially outwardly of the sealing ring.

6. A fitting, comprising:
a main body component comprising interior and exterior surfaces, wherein the interior surface defines a cavity extending through the main body component along an axis;
a latching band securely maintained within the interior surface, wherein the latching band comprises a radially inner surface and a radially inwardly extending latch;
a sealing ring securely maintained within the interior surface and against the radially inner surface of the latching band, wherein the sealing ring is formed with an opening, and wherein the radially inwardly extending latch extends through the sealing ring opening, wherein the radially inwardly extending latch comprises a radial distance from the axis that is less than a radial distance from the axis to the sealing ring; and
wherein the main body component comprises an axially outer edge and wherein the sealing ring comprises an expandable material comprising an axially outer edge that lies axially aligned with or inwardly of the axially outer edge of the main body component when the sealing ring is at rest and lies axially outwardly of the axially outer edge of the main body component when the sealing ring is compressed.

7. The fitting of claim 6, wherein the interior surface comprises an axially inner segment and an axially outer segment, wherein the latching band and the sealing ring are maintained within the axially outer segment.

8. The fitting of claim 7, wherein the main body component comprises a first radial thickness corresponding to the axially inner segment and a second radial thickness corresponding to the axially outer segment, and wherein the first radial thickness is greater than the second radial thickness.

9. The fitting of claim 6, wherein the latching band is maintained within the interior surface axially outwardly of the sealing ring.

10. A fitting, comprising:
a main body component comprising interior and exterior surfaces, wherein the main body component is formed with first and second radially outwardly extending indentations;
a latching band maintained within the first indentation, wherein the latching band comprises a radially inner surface; and
a sealing ring maintained within the second indentation and against the radially inner surface of the latching band, wherein the sealing ring is formed with an opening, and wherein a portion of the latching band extends through the sealing ring opening.

11. The fitting of claim 10, wherein the latching band further comprises a radially inwardly extending latch comprising one or more rings.

12. The fitting of claim 10, wherein the latching band is formed with an opening, wherein a perimeter extends around the opening, wherein the latching band further comprises a radially inwardly extending latch and wherein the radially inwardly extending latch is formed at the perimeter.

13. The fitting of claim 10, wherein the latching band is formed with a plurality of openings.

14. The fitting of claim 10, wherein the main body component comprises an axially outer edge and wherein the sealing ring comprises an expandable material comprising an axially outer edge that lies axially aligned with or inwardly of the axially outer edge of the main body component when the sealing ring is at rest and lies axially outwardly of the axially outer edge of the main body component when the sealing ring is compressed.

15. The fitting of claim 10, wherein the interior surface comprises an axially inner segment and an axially outer segment, wherein the latching band and the sealing ring are maintained within the axially outer segment, wherein the main body component comprises a first radial thickness corresponding to the axially inner segment and a second radial thickness corresponding to the axially outer segment, and wherein the first radial thickness is greater than the second radial thickness.

16. The fitting of claim 10, wherein the first indentation is axially outward of the second indentation.

17. The fitting of claim 10, wherein the first indentation comprises a radial distance from the axis that is less than a radial distance from the axis to the second indentation.

18. A fitting, comprising:
a main body component comprising interior and exterior surfaces, wherein the main body component is formed with first and second radially outwardly extending indentations;
a latching band maintained within the first indentation, wherein the latching band comprises a radially inner surface, wherein the latching band further comprises a radially inwardly extending latch comprising one or more rings; and a sealing ring maintained within the second indentation and against the radially inner surface of the latching band.

19. A fitting, comprising:

a main body component comprising interior and exterior surfaces, wherein the main body component is formed with first and second radially outwardly extending indentations;

a latching band maintained within the first indentation, wherein the latching band comprises a radially inner surface, wherein the latching band is formed with an opening, wherein a perimeter extends around the opening, wherein the latching band further comprises a radially inwardly extending latch and wherein the radially inwardly extending latch is formed at the perimeter; and a sealing ring maintained within the second indentation and against the radially inner surface of the latching band.

20. A fitting, comprising:

a main body component comprising interior and exterior surfaces, wherein the main body component is formed with first and second radially outwardly extending indentations;

a latching band maintained within the first indentation, wherein the latching band comprises a radially inner surface, wherein the latching band is formed with a plurality of openings; and a sealing ring maintained within the second indentation and against the radially inner surface of the latching band.

21. A fitting, comprising:

a main body component comprising interior and exterior surfaces, wherein the main body component is formed with first and second radially outwardly extending indentations;

a latching band maintained within the first indentation, wherein the latching band comprises a radially inner surface;

a sealing ring maintained within the second indentation and against the radially inner surface of the latching band; and wherein the main body component comprises an axially outer edge and wherein the sealing ring comprises an expandable material comprising an axially outer edge that lies axially aligned with or inwardly of the axially outer edge of the main body component when the sealing ring is at rest and lies axially outwardly of the axially outer edge of the main body component when the sealing ring is compressed.

* * * * *